(12) United States Patent
Burnet et al.

(10) Patent No.: US 7,130,772 B2
(45) Date of Patent: Oct. 31, 2006

(54) METHOD AND APPARATUS FOR ESTIMATING A PARAMETER BASED ON A PLURALITY OF REDUNDANT SIGNALS

(75) Inventors: Cheri S. Burnet, Maidens, VA (US); Cary T. Powell, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 66 days.

(21) Appl. No.: 10/819,632

(22) Filed: Apr. 7, 2004

(65) Prior Publication Data

US 2005/0228619 A1 Oct. 13, 2005

(51) Int. Cl.
*G06F 15/00* (2006.01)
(52) U.S. Cl. ................................................. 702/189
(58) Field of Classification Search ........ 702/182–185, 702/189, 194, 199; 706/2, 4, 8, 22; 701/54, 701/57, 100, 106, 107
See application file for complete search history.

(56) References Cited

U.S. PATENT DOCUMENTS

| | | | |
|---|---|---|---|
| 5,436,826 A | 7/1995 | O'Flarity | |
| 5,602,732 A | 2/1997 | Nichols et al. | |
| 5,680,409 A | 10/1997 | Qin et al. | |
| 6,073,262 A * | 6/2000 | Larkin et al. | 714/736 |
| 6,098,011 A | 8/2000 | Scott | |
| 6,157,894 A | 12/2000 | Hess et al. | |
| 6,662,140 B1 * | 12/2003 | Martis | 702/179 |

FOREIGN PATENT DOCUMENTS

EP 718 485 * 6/1996

OTHER PUBLICATIONS

Healy, T. et al., "Model Based Fuzzy Logic Sensor Fault Accommodation," Journal of Engineering for Gas Turbines and Power-Transactions of the ASME, vol. 120, No. 3, 1998, pp. 533-536.
Asok Ray et al., Calibration and Estimation of Redundant Signals for Real-Time Monitoring and Control, Signal Processing, Dec. 2003, pp. 2593-2605, vol. 83, No. 12, Amsterdam, NL.
European Search Report for EP Patent Application No. 05252112.7.

* cited by examiner

*Primary Examiner*—Michael Nghiem
(74) *Attorney, Agent, or Firm*—Bachman & LaPointe, P.C.

(57) ABSTRACT

In a method for estimating a parameter based on signals received from redundant sensors, at least a first sensed signal and a second sensed signal are received from at least corresponding first and second redundant sensors. The first sensed signal and the second sensed signal are indicative of the parameter, wherein the first sensed signal has associated therewith a first accuracy, wherein the second sensed signal has associated therewith a second accuracy. At least a reference signal indicative of the parameter is received, wherein the reference signal has associated therewith a reference accuracy. A weighting is determined based on at least the first sensed signal, the second sensed signal, and based on at least one of the first accuracy, the second accuracy, and the reference accuracy.

46 Claims, 8 Drawing Sheets

METHOD AND APPARATUS FOR ESTIMATING A PARAMETER BASED ON A PLURALITY OF REDUNDANT SIGNALS

GOVERNMENT RIGHTS NOTICE

The Government has rights in this invention pursuant to Contract No. N00019-02-C-3003, awarded by the U.S. Navy.

FIELD OF THE DISCLOSURE

The present disclosure generally relates to systems that estimate a parameter, and more particularly to systems that estimate a parameter based on a plurality of redundant signals representative of the parameter.

BACKGROUND

Many systems employ redundancy to preserve system functionality should a particular component fail. Often however, redundancy by itself is not sufficient, and the system must have the ability to "detect" (e.g., recognize the occurrence of), "isolate" (e.g., identify the source of), and "accommodate" (e.g., respond to, the failure (fault)). For some faults, detection and isolation are one and the same. For example, a processor can fail a memory check, and a servo valve can reveal a short or open via a current check.

Some other categories of faults, however, are more difficult to detect, isolate, and accommodate. For example, modern gas turbine aircraft engines are frequently equipped with a pair of sensors (transducers) for each parameter (e.g., temperature) to be measured. Each sensor produces a signal indicative of the value of the sensed parameter. Due to measurement inaccuracies, the indicated value can deviate from the true (actual) value of the parameter. The amount of this deviation (error) depends in part on the condition, i.e. state or health, of the sensor. If the sensed values for a parameter agree, i.e. are relatively close to one another, then it is generally assumed that both sensors are healthy, and either one may be used as an estimate of the actual value. Alternatively, an estimate may be produced by averaging the two values. However, if the sensed values do not agree, one or both sensors may have failed. To produce the best estimate of the actual value of the parameter, it is desirable to detect and isolate a fault. Some sensor faults can be detected and isolated by comparing each sensor signal to an expected range and an expected rate of change.

Various other approaches for detecting, isolating, and accommodating sensor faults presently exist. One such approach uses knowledge of the most likely failure modes for that type of sensor and attempts to determine whether one sensor is more likely than the other to have failed.

Another approach compares the potential consequences of selecting each one of the sensor magnitudes as the estimate of the actual magnitude, should the selected sensor be the erroneous one. The sensor magnitude having the least hazardous potential consequences is selected, i.e. select "safe". For example, the consequences of picking an erroneously low magnitude engine speed signal may include catastrophically overspeeding the engine. The consequences of picking an erroneously high magnitude signal are usually limited to an engine performance loss due to unnecessarily limiting engine speed. By this logic, the obvious choice for a select "safe" strategy is to choose the high signal.

Yet another approach incorporates a model that provides an analytical third sensor to help detect and isolate sensor faults. For example, real-time engine models are available that are suitable for incorporation in the engine control system's embedded software. (See Kerr, L. J., Nemec T. S., and Gallops G. W., 1992, "Real-time Estimation of Gas Turbine Engine Damage Using a Control Based Kalman Filter Algorithm," Journal of Engineering for Gas Turbines and Power, vol. 114, no. 2, pp. 187–195). The actual value of the parameter may be estimated, for example, by determining the mean or the median of the three sensors.

Additionally, the actual value may be estimated using a parity space method that examines the relative differences between each of the three sensed magnitudes. (See Patton, R. J., and Chen, J., 1992, "Review Of Parity Space Approaches To Fault Diagnosis Applicable To Aerospace Systems," Proc. AIAA Guidance, Navigation And Control Conference, AIAA-92-4538). In a traditional parity space implementation, however, the system compares the relative difference information to a fault threshold and characterizes the health of each sensor as either valid or faulty. Thus, if one sensor disagrees with the others, but the relative differences do not exceed the fault threshold, the sensor is considered valid. On the other hand, if the relative differences become large enough that the fault threshold is exceeded, the sensor is considered faulty. Sensors characterized as valid are used to estimate the actual magnitude of the parameter. Sensors characterized as faulty are not used in the estimation.

U.S. Pat. No. 6,073,262 to Larkin et al. describes an example system that uses fuzzy logic to generate an estimate of a value of a parameter based on three redundant signals, with one of the redundant signals being, for example, an output of a model. The system generates three difference signals corresponding to the differences between each pair of the three redundant signals. Then, the three difference signals are converted to three corresponding "fuzzy" inputs based on a plurality of fuzzy membership functions. Next, each fuzzy logic rule of a plurality of fuzzy logic rules is evaluated, based on the fuzzy inputs, to generate a rule output value. Additionally, for each fuzzy logic rule, a degree of fulfillment of the fuzzy logic rule is generated. Finally, the plurality of rule output values and the plurality of degrees of fulfillment are used to generate an estimate of the value of the parameter.

SUMMARY

In accordance with one aspect of the disclosure, a method is disclosed for estimating a parameter based on signals received from redundant sensors. The method may include receiving at least a first sensed signal and a second sensed signal from at least corresponding first and second redundant sensors, the first sensed signal and the second sensed signal indicative of the parameter, wherein the first sensed signal has associated therewith a first accuracy, wherein the second sensed signal has associated therewith a second accuracy. The method also may include receiving at least a reference signal indicative of the parameter, wherein the reference signal has associated therewith a reference accuracy. The method may further include determining a weighting based on at least the first sensed signal, the second sensed signal, and based on at least one of the first accuracy, the second accuracy, and the reference accuracy. Additionally, the method may include generating an estimate of the parameter as a weighted average, according to the weighting, of at least a value of the first sensed signal, a value of the second sensed signal, and a value of the reference signal.

In accordance with another aspect of the disclosure, an apparatus for estimating a parameter based on signals received from redundant sensors is disclosed. The apparatus may comprise a weighting calculator to generate weighting information in response to a first sensed signal, a second sensed signal, a reference signal, the weighting information based on a first accuracy associated with the first sensed signal, a second accuracy associated with the second sensed signal, and a reference signal accuracy associated with the reference signal. The first sensed signal is indicative of the parameter and corresponds to a first redundant sensor, and the second sensed signal is indicative of the parameter and corresponds to a second redundant sensor. The reference signal is indicative of the parameter. The apparatus may also comprise a weighted average calculator to generate an estimate of the parameter based on the first sensed signal, the second sensed signal, the reference signal, and the weighting information.

In accordance with yet another aspect of the disclosure, another method for estimating a parameter based on signals received from redundant sensors is disclosed. The method may include receiving at least a first sensed signal and a second sensed signal from at least corresponding first and second redundant sensors, the first sensed signal and the second sensed signal indicative of the parameter, wherein the first sensed signal has associated therewith a first accuracy, wherein the second sensed signal has associated therewith a second accuracy. Additionally, the method may include receiving at least a reference signal indicative of the parameter, wherein the reference signal has associated therewith a reference accuracy. The method may also include generating a first error magnitude signal based on at least the first sensed signal and the reference signal, and generating a second error magnitude signal based on at least the second sensed signal and the reference signal. The method may further include normalizing the first error magnitude signal, based on at least the first accuracy, the second accuracy, and the reference accuracy, and normalizing the second error magnitude signal, based on at least the first accuracy, the second accuracy, and the reference accuracy. Additionally, the method may include evaluating a fuzzy rulebase based on at least the normalized first error magnitude signal and the normalized second error magnitude signal, and generating an estimate of the parameter based on at least the evaluated fuzzy rulebase.

In accordance with still another aspect of the disclosure, another apparatus for estimating a parameter based on signals received from redundant sensors is disclosed. The apparatus may comprise an error magnitude calculator to generate a first error magnitude signal and a second error magnitude signal in response to a first sensed signal received from a first redundant sensor, a second sensed signal received from a second redundant sensor, and a reference signal, the first sensed signal, the second sensed signal, and the reference signal indicative of the parameter. The apparatus may additionally comprise a normalizer to generate a first normalized error magnitude signal and a second normalized error magnitude signal in response to the first error magnitude signal and the second error magnitude signal, and based on a first accuracy associated with the first sensed signal, a second accuracy associated with the second sensed signal, and a reference signal accuracy associated with the reference signal. The apparatus may further comprise a fuzzy logic estimate calculator to generate an estimate of the parameter in response to the first normalized error magnitude signal and the second normalized error magnitude signal, and according to a fuzzy rulebase.

In accordance with yet another aspect of the disclosure, an engine control system is disclosed. The system may include a first redundant sensor to generate a first sensed signal indicative of a parameter associated with an aircraft engine, the first sensed signal having a first accuracy associated therewith, and a second redundant sensor to generate a second sensed signal indicative of the parameter, the second sensed signal having a second accuracy associated therewith. The system may also include a reference signal generator to generate a reference signal indicative of the parameter, the reference signal having a reference signal accuracy associated therewith, and a weighting calculator operatively coupled to the first redundant sensor, the second redundant sensor, and the reference signal generator to generate weighting information in response to the first sensed signal, the second sensed signal, and the redundant signal, the weighting information based on the first accuracy, the second accuracy, and the reference signal accuracy. The system may further include a weighted average calculator to generate an estimate of the parameter in response to the first sensed signal, the second sensed signal, the redundant signal, and the weighting information.

In accordance with a further aspect of the disclosure, another engine control system is disclosed. The system may comprise a first redundant sensor to generate a first sensed signal indicative of a parameter associated with an aircraft engine, the first sensed signal having a first accuracy associated therewith, and a second redundant sensor to generate a second sensed signal indicative of the parameter, the second sensed signal having a second accuracy associated therewith. Additionally, the system may comprise a reference signal generator to generate a reference signal indicative of the parameter, the reference signal having a reference signal accuracy associated therewith, and an error magnitude calculator operatively coupled to the first redundant sensor, the second redundant sensor, and the reference signal generator to generate a first error magnitude signal and a second error magnitude signal in response to the first sensed signal, the second sensed signal, and the reference signal. The system may further comprise a normalizer to generate a first normalized error magnitude signal and a second normalized error magnitude signal in response to the first error magnitude signal and the second error magnitude signal and based on the first accuracy, the second accuracy, and the reference signal accuracy, and a fuzzy logic estimate calculator to generate an estimate of the parameter in response to the first normalized error magnitude signal and the second normalized error magnitude signal, and according to a fuzzy rulebase.

BRIEF DESCRIPTION OF THE DRAWINGS

The features and advantages of the methods and apparatus described herein will be best appreciated upon reference to the following detailed description and the accompanying drawings, in which.

DETAILED DESCRIPTION

Overview of Fuzzy Logic Techniques

Figure 1:
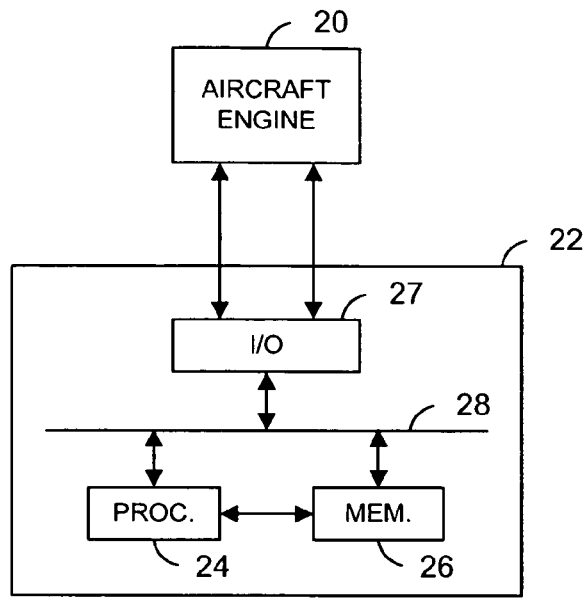
FIG. 1 is a block diagram of an aircraft engine controlled by an engine controller.

Fuzzy logic techniques have been applied in a variety of fields of technology. These techniques may be useful, for example, when "real world" concepts associated with a particular system, apparatus, etc., are difficult to precisely characterize by Boolean (true or false) variables. For example, a temperature may be characterized as "hot," "warm," or "cold." Fuzzy logic systems are better suited to such characterizations than are Boolean systems because fuzzy logic systems use multi-valued logic expressions instead of Boolean expressions.

Fuzzy logic systems typically represent the value of a variable as a "degree of membership" in each fuzzy set of a plurality of fuzzy sets. A "real world" variable, value, expression, etc., may be referred to as "crisp" (e.g., a "crisp" variable, a "crisp" value, a "crisp" expression). A fuzzy membership function is a correspondence that associates crisp input values with a degree of membership in a fuzzy set. Fuzzy sets are often assigned linguistic names such as "fast," "moderate," "slow." A crisp input value may have a degree of membership in two or more fuzzy sets at the same time, e.g., an engine speed may be concurrently somewhat "fast" yet somewhat "moderate" which may be expressed for example as "speed=35% fast, 45% moderate, 0% slow." This type of representation is commonly referred to as a "fuzzy variable"; and the step of converting a crisp variable to a fuzzy variable is commonly referred to as "fuzzification". The use of fuzzy variables may enable a system to provide a more precise characterization of the value of the "real world" variable than that provided by a Boolean system.

To be useful, a fuzzy logic system employs a plurality of fuzzy logic rules, which are sometimes collectively referred to as a "fuzzy rulebase." Fuzzy logic rules are similar to Boolean logic rules e.g., IF condition THEN consequence, except that they use fuzzy set theory rather than binary logic. In a step sometimes referred to as "fuzzy inferencing," the condition portion of each rule is evaluated with respect to the fuzzy input variables to determine a "degree of fulfillment" for that rule. A condition may comprise a compound condition connected by a logical operator (e.g., AND or OR). For example, "condition$_1$ AND condition$_2$" may be defined as the minimum of condition$_1$ and conditions$_2$. As another example, condition1 OR condition$_2$ may be defined as the maximum of condition$_1$ and condition$_2$.

The consequence portion of a rule is typically in the form of degrees of membership in various membership functions comparable to, but not identical to, those used for fuzzification, such as "output=40% high, 20% medium, 0% low."

The results of the fuzzy inferencing are sometimes collectively referred to as a "fuzzy output" or "fuzzy output variable".

The fuzzy output variable is ultimately converted into a crisp output for output from the fuzzy logic system. This step, commonly referred to as "defuzzification", may involve the use of a method such as a "mean of the maxima" method or a "centroid" method.

Engine Control

Embodiments of the present invention may be used in a variety of systems in which a parameter value is to be determined based on a plurality of signals indicative of the parameter value. An example of such a system is an aircraft engine control system. Referring now to FIG. 1, an aircraft engine 20 may be controlled by an engine controller 22, commonly referred to as a "FADEC" for Full Authority Digital Engine Control or an "EEC" for Electronic Engine Control, having a processor 24, a memory 26, and an input/output (I/O) unit 27. Some or all of the processor 24, the memory 26, and the I/O unit 27 may be operatively coupled via a bus 28. In some examples, one or both of the memory 26 and the I/O unit 27 may be coupled to the processor 24 via another operative connection besides the bus 28. The engine controller 22 may be communicatively coupled to the engine 20 and may receive signals from sensors (not shown) that provide data on various engine parameters, such as temperature, pressure, rotations per minute (rpm), etc. With regard to many parameters, the data is redundant, being provided by two or more signals for one particular parameter. In addition to receiving signals from the sensors, the engine controller 22 may transmit control signals to various components of the engine 20 such as actuators to control the engine 20.

Figure 2:
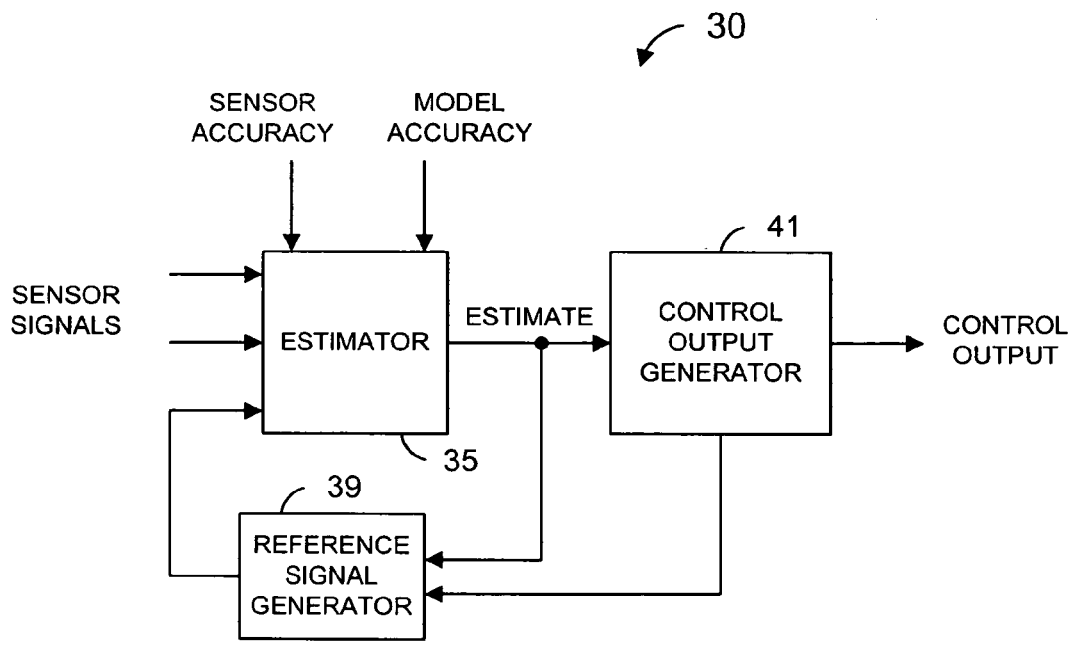
FIG. 2 is a block diagram of a portion of an example engine control program.

An engine control program stored in the memory section 26 may direct the controller 22 to monitor the signals received from the engine 20 and to transmit control signals to the engine 20. FIG. 2 is a block diagram of a portion 30 of an example engine control program, which may include an estimator 35, a reference signal generator 39, and a control output generator 41. The estimator 35 may receive a plurality of sensor signals (e.g., 2 sensor signals) corresponding to one parameter of the engine 20. The estimator 35 may also receive a reference signal from the reference signal generator 39, wherein the reference signal from the model also corresponds to the parameter of the engine 20. The estimator 35 may further receive indications of the accuracies associated with the sensor signals and the reference signal. An accuracy associated with a sensor signal or reference signal may generally indicate an amount, range, degree, etc., by which the actual value of the parameter may differ from the value indicated by the sensor signal. The accuracy of a signal may vary over time. For example, the accuracy may vary as the parameter being sensed varies. Similarly, the accuracy may vary as other conditions vary. For instance, the accuracy may vary as a power supply to a sensor varies. The indications of the accuracies may be retrieved, for example, from a look up table based on a particular condition or set of conditions. For example, the accuracy of the signal may be retrieved based on the value of the signal. As another example, the accuracies may be calculated based on the particular condition or set of conditions, etc. For instance, the accuracy of a signal may be calculated as a percentage of a value of the signal. In the examples described below, the accuracy of a signal may be represented as a value by which the signal may vary positively or negatively. In general, however, the accuracy of a signal may be represented in any of a variety of ways including, for example, as a percentage of the signal, a range in which the signal may vary, etc.

The estimator 35 may generate an estimate signal, which is an estimate of the value of the parameter, based on the signals corresponding to the parameter and the accuracies of the signals. The estimate signal may be provided to the control output generator 41 and to the reference signal generator 39. The control output generator 41 may generate an output signal that may be used in determining the appropriate action to be initiated by the controller 22 in controlling the engine 20. Additionally, the reference signal generator 39 may use the estimate signal from the estimator 35 to generate a prediction of the parameter value. The reference signal generator 39, alternatively or additionally, may use signals besides the estimate signal from the estimator 35. For example, the reference signal generator 39 may receive one or more signals from the control output generator 41 and use these signals to generate the prediction. The reference signal generator 39 may comprises a model configured to generate a signal indicative of the parameter. The reference signal generator 39 may also comprise another sensor that generates a signal corresponding to the parameter. Further, the reference signal generator 39 may comprise a processing device that generates the reference signal based on a signal indicative of a different parameter that is related to the parameter. For example, the signal indicative of the different parameter may be received from a sensor that monitors the different parameter.

Several example parameter estimators are described below. It is to be understood that similar parameter estimators may be used in a variety of systems in which a parameter value is to be determined based on a plurality of signals indicative of the parameter value. Thus, similar parameter estimators may be used in non-aircraft engine control systems as well as in systems other than engine control systems. The parameter to be estimated may be any of various parameters such as temperature, pressure, speed, altitude, attitude, rpm, torque, effector position, position, etc.

Parameter Estimator

Figure 3:
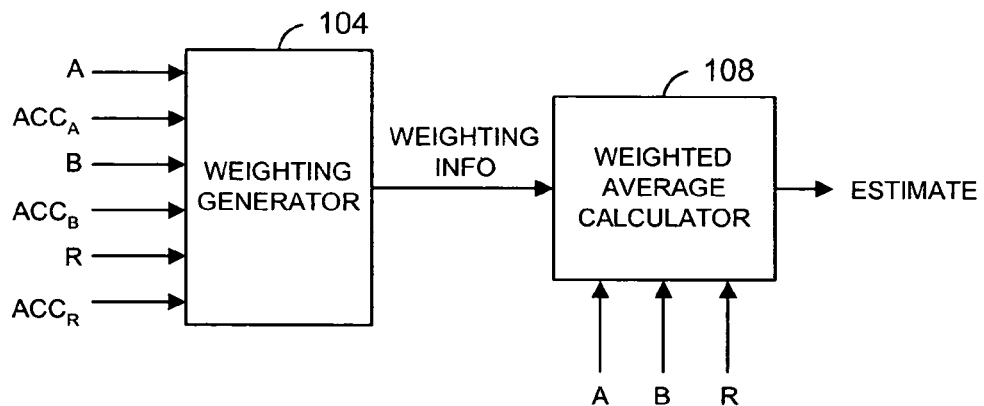
FIG. 3 is a block diagram of an example of the estimator of FIG. 2.

FIG. 3 is a block diagram of an example estimator 35. The estimator 35 comprises a weighting generator 104 and a weighted average calculator 108. The weighting generator 104 may receive two or more signals indicative of a parameter from redundant sensors. In FIG. 3, two such signals are indicated as "A" and "B." The weighting generator 104 may also receive one or more reference signals indicative of the parameter. One such reference signal is indicated as "R" in FIG. 3. The weighting generator 104 may further receive indications of the accuracy of the redundant sensor signals and the reference signals. For example, the weighting generator 104 may receive an indication of accuracy for each of the redundant sensor signals and the reference signals. If the accuracies of two or more signals are the same, only one indication of accuracy may be provided for those signals.

The weighting generator 104 generates weighting information based on the redundant sensor signals, the reference signals, and the corresponding accuracies. The weighting information may be generated using a variety of techniques. For example, the weighting information may be generated using, in whole or in part, fuzzy logic methods.

The weighting information may comprise indications of the weights of each of the signals in the redundant sensor signals and the reference signals to be used in calculating a weighted average of the redundant sensor signals and the reference signals. Additionally or alternatively, the weighting information may comprise other information. For instance, the weighting information may comprise information indicative of a way to calculate the parameter based on the redundant sensor signals and the reference signals. Additionally, the weighting information may comprise indications of weights of combinations of the redundant sensor signals and the reference signals. A combination may include, for example, an average of two or more of the redundant sensor signals and the reference signals.

The reference signal may comprise a signal received, for example, from a model that generates an indication of the parameter, another redundant sensor whose signal is indicative of the parameter, from a processing device that generates an indication of the parameter from a signal of a sensor monitoring another related, but separate, parameter, etc. Referring to FIG. 2, the reference signal may be received, for example, from the reference signal generator 39.

The weighted average calculator 108 may receive the redundant sensor signals, the reference signals, and the weighting information from the weighting generator 104, and then generate an estimate of the parameter. The estimate of the parameter is a weighted average of the redundant sensor signals and the reference signals according to a weighting indicated by the weighting information. The weighted average of the redundant sensor signals and the reference signals may be generated in any number of ways. For example, if the weighting information indicates that the estimate should merely be a particular one of the redundant sensor signals, the estimate may merely be generated by selecting the particular redundant sensor signal. As another example, particular combinations of the redundant sensor signals and the reference signals may first be generated, and then the estimate may be generated as a weighted average of two or more of the redundant sensor signals, the reference signals, and the combinations.

Figure 4:
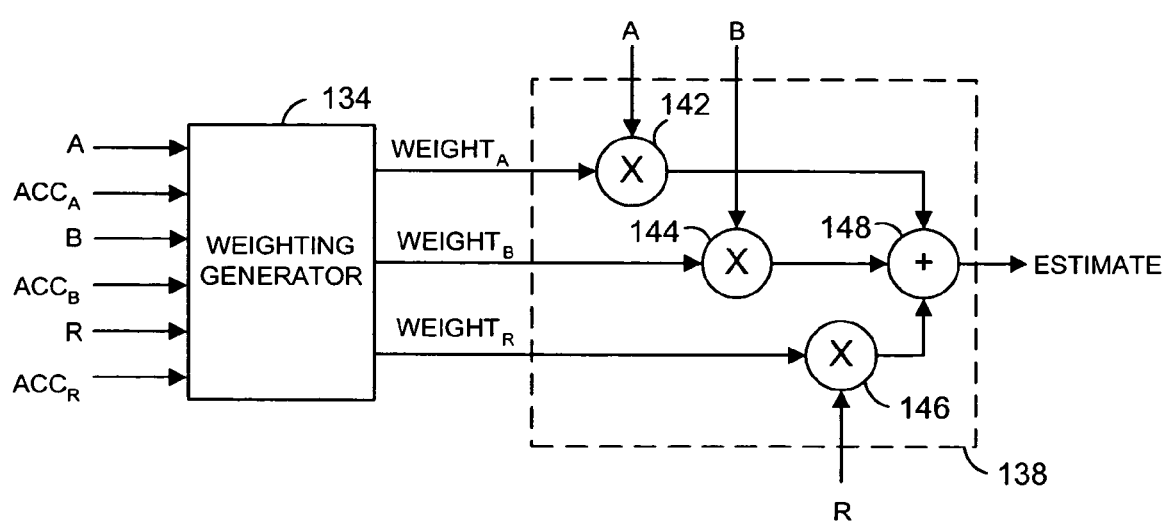
FIG. 4 is a block diagram of another example estimator.

FIG. 4 is a block diagram of another example estimator 130. In this example, a weighting generator 134 generates weights $WEIGHT_A$, $WEIGHT_B$, and $WEIGHT_R$ based on redundant sensor signals A and B, a reference signal R, and corresponding accuracies. A weighted average calculator 138 comprises multipliers 142, 144, and 146, which each multiply one of the signals A, B, and R by a corresponding weight provided by the weighting generator 134. An adder 148 adds the outputs of the multipliers 142, 144, and 146 to generate the estimate of the parameter.

Figure 5:
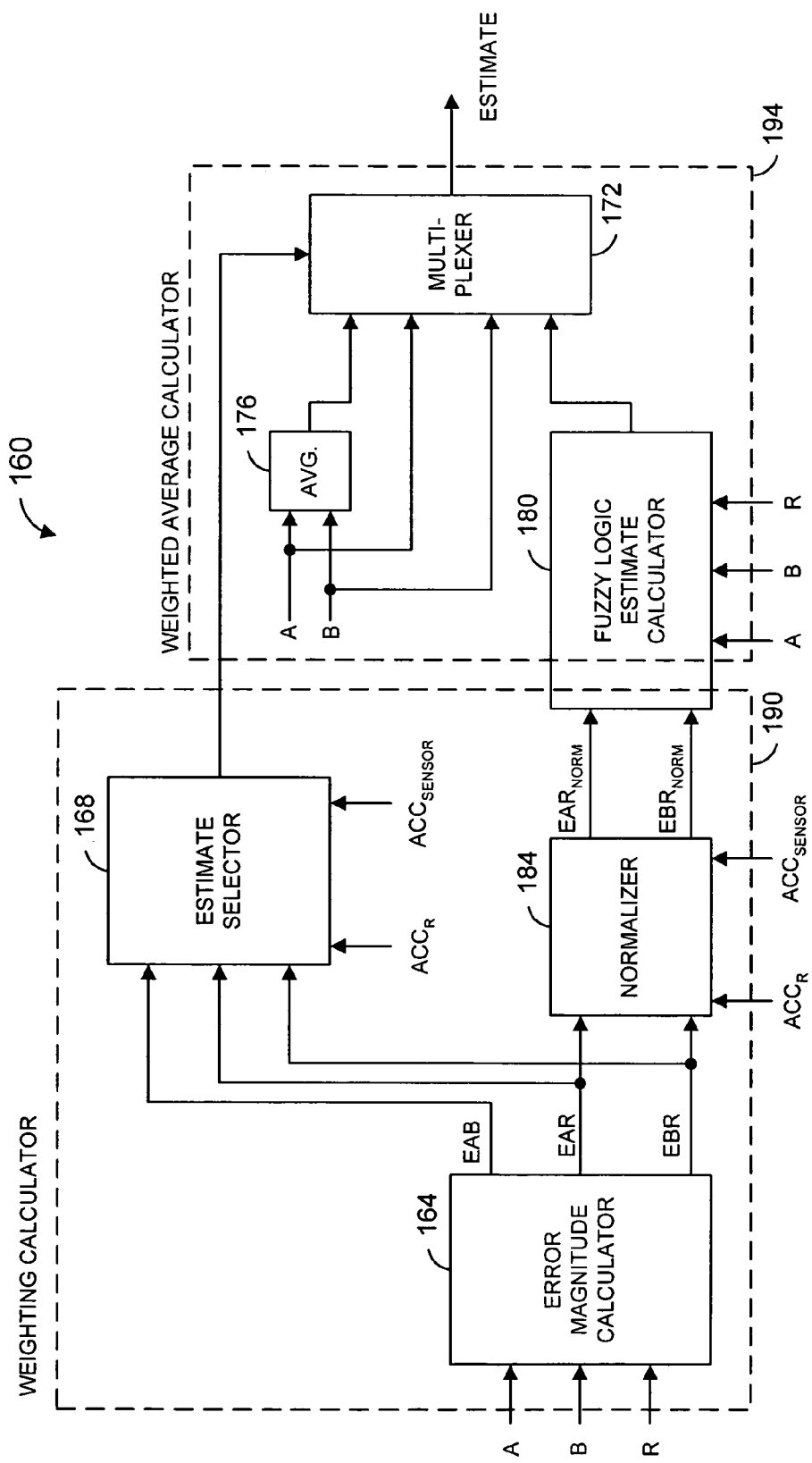
FIG. 5 is a block diagram of yet another example estimator.

FIG. 5 is a block diagram of yet another example estimator 160. The example estimator 160 of FIG. 5 receives two redundant sensor signals A and B, and a reference signal R. Additionally, the estimator 160 receives an indication ($ACC_{SENSOR}$) of the accuracies of the sensor signals A and B. In this example, the accuracy of A is the same as the accuracy of B. Additionally, the estimator 160 receives an indication ($ACC_R$) of the accuracy of the reference signal R.

The estimator 160 comprises an error magnitude calculator 164 that receives the signals A, B, and R and then generates three corresponding error magnitude signals EAB, EAR, and EBR. The error magnitude EAB may be, for example, the absolute value of the difference between the signals A and B. The error magnitude EAR may be, for example, the absolute value of the difference between the signals A and R. Similarly, the error magnitude EBR may be, for example, the absolute value of the difference between the signals B and R.

An estimate selector 168 receives the error magnitude signals and also receives the accuracies $ACC_{SENSOR}$ and $ACC_R$. Based on EAB, EAR, EBR, $ACC_{SENSOR}$, and $ACC_R$, the estimate selector 168 generates an indication of a technique to calculate the estimate. The indication generated by the estimate selector 168 is provided to a multiplexer 172.

The multiplexer 172 receives the signals A and B as inputs. Additionally, another input to the multiplexer 172 is an output of an average calculator 176. The average calculator 176 generates an average of the signals A and B. Yet another input to the multiplexer 172 is an output of a fuzzy logic estimate calculator 180. The multiplexer 172 selects one of its inputs, based on the output of the estimate selector 168, as the estimate of the parameter.

The estimate calculator 160 further comprises a normalizer 184. The normalizer 184 normalizes the signals EAR and EBR to generate normalized error magnitude signals $EAR_{NORM}$ and $EBR_{NORM}$, based on the accuracies $ACC_{SENSOR}$ and $ACC_R$. For example, the normalizer 184 may generate the normalized signals according to the following equations:

$$EAR_{NORM} = EAR/(ACC_{SENSOR} + ACC_R); \quad (1)$$

$$EBR_{NORM} = EBR/(ACC_{SENSOR} + ACC_R). \quad (2)$$

In implementations in which the accuracies associated with signals A and B are not the same, then the normalized signals may be similarly calculated according to the following equations:

$$EAR_{NORM} = EAR/(ACC_A + ACC_R); \quad (3)$$

$$EBR_{NORM} = EBR/(ACC_B + ACC_R); \quad (4)$$

where $ACC_A$ is an accuracy associated with the signal A and $ACC_B$ is an accuracy associated with the signal B. In other examples, the normalized signals can be generated in a manner that differs from that indicated by equations (1)–(4).

The fuzzy logic estimate calculator 180 receives the normalized signals $EAR_{NORM}$ and $EBR_{NORM}$, as well as the signals A, B, and R, and generates a weighted average of the signals A, B, and R. The fuzzy logic estimate calculator 180 will be described in more detail subsequently.

Referring now to FIGS. 3 and 5, the error magnitude calculator 164, the estimate selector 168, the normalizer 184, and a portion of the fuzzy logic estimate calculator 180 may form, at least in part, a weighting calculator similar to the weighting calculator 104 of FIG. 3. Additionally, the multiplexer 172, the average calculator 176, and another portion of the fuzzy logic estimate calculator 180 may form, at least in part, a weighted average calculator similar to the weighted average calculator 108 of FIG. 3.

Figure 6:
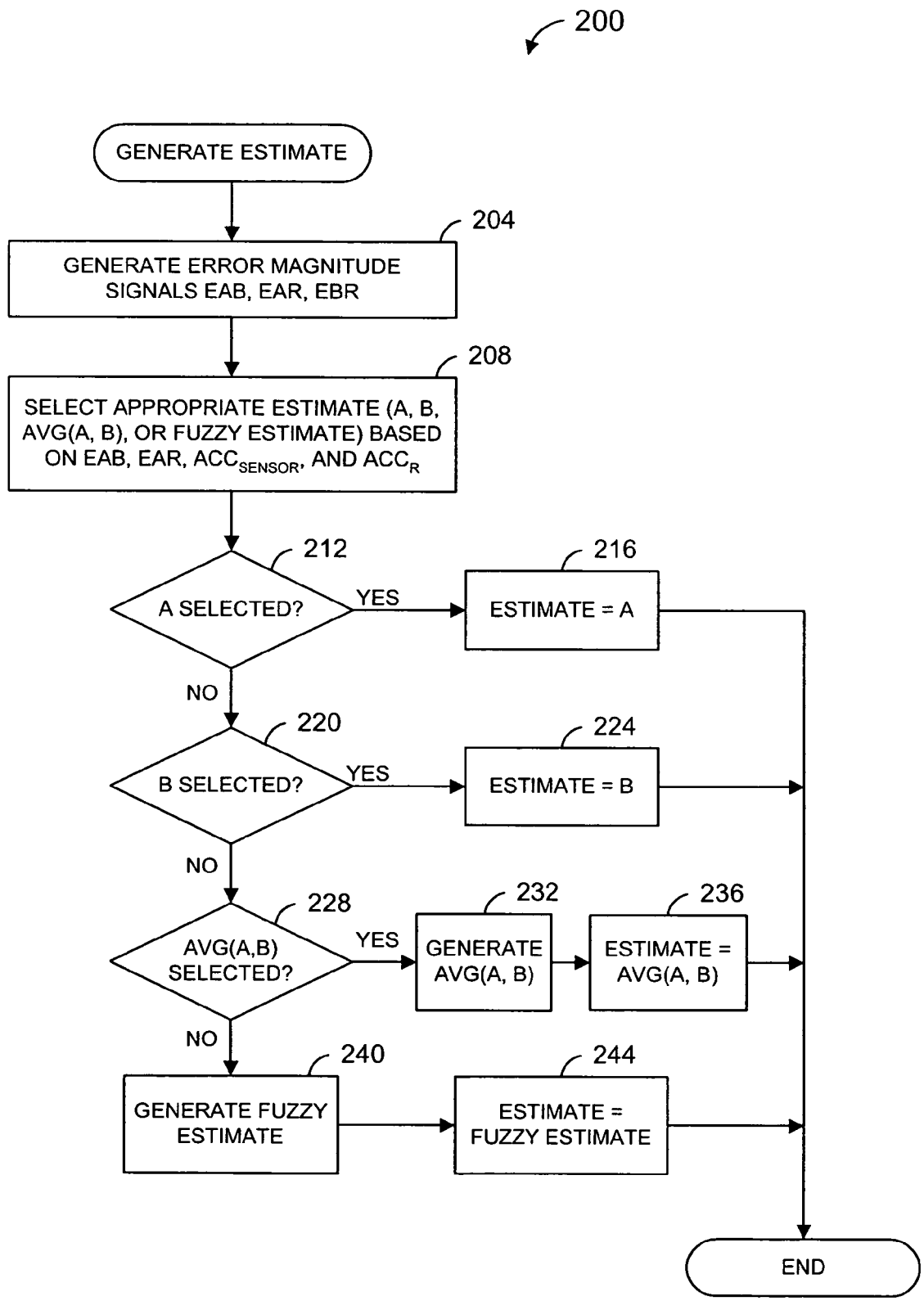
FIG. 6. is a flow diagram of an example method for generating an estimate of a parameter based on signals received from redundant sensors.

The general operation of the estimate generator 160 will now be described with reference to FIG. 6. In particular, FIG. 6 is a flow diagram of an example method 200 for generating an estimate of a parameter based on signals received from redundant sensors. The method 200 will be described with reference to FIG. 5.

At a block 204, error magnitude signals EAB, EAR, and EBR are generated based on the signals A, B, and R. As described previously with reference to FIG. 5, the error magnitude calculator 164 may generate the error magnitude signals EAB, EAR, and EBR. At a block 208, a technique for generating the estimate is selected. For example, one of four techniques may be selected: (1) set the estimate to A; (2) set the estimate to B; (3) set the estimate to the average of A and B; or (4) set the estimate to the output of a fuzzy logic estimate calculator. With regard to the estimator 160 of FIG. 5, the estimate selector 168 may generate an indication of an appropriate technique for generating the estimate, and this indication may be provided to the multiplexer 172.

At a block 212, if it was determined that the estimate should be set to the signal A, then the estimate is set to A at a block 216. Referring to FIG. 5, if the output of the estimate selector 168 indicates the estimate should be set to A, then the multiplexer 172 selects A as the estimate. Similarly, at a block 220, if it was determined that the estimate should be set to the signal B, then the estimate is set to B at a block 224. Referring to FIG. 5, if the output of the estimate selector 168 indicates the estimate should be set to B, then the multiplexer 172 selects B as the estimate.

At a block 228, if it was determined that the estimate should be set to an average of the signals A and B, then the average of A and B is generated at block 232. Next, the estimate is set to the average of A and B at a block 236. Referring to FIG. 5, if the output of the estimate selector 168 indicates the estimate should be the average of A and B, then the multiplexer selects the output of the average calculator 176 as the estimate.

If at block 228 it was determined that the estimate should not be set to an average of the signals A and B, then at a block 240, an estimate of the parameter is generated using a fuzzy logic technique. At a block 244, the estimate is set to the estimate generated using the fuzzy logic technique.

Figure 7:
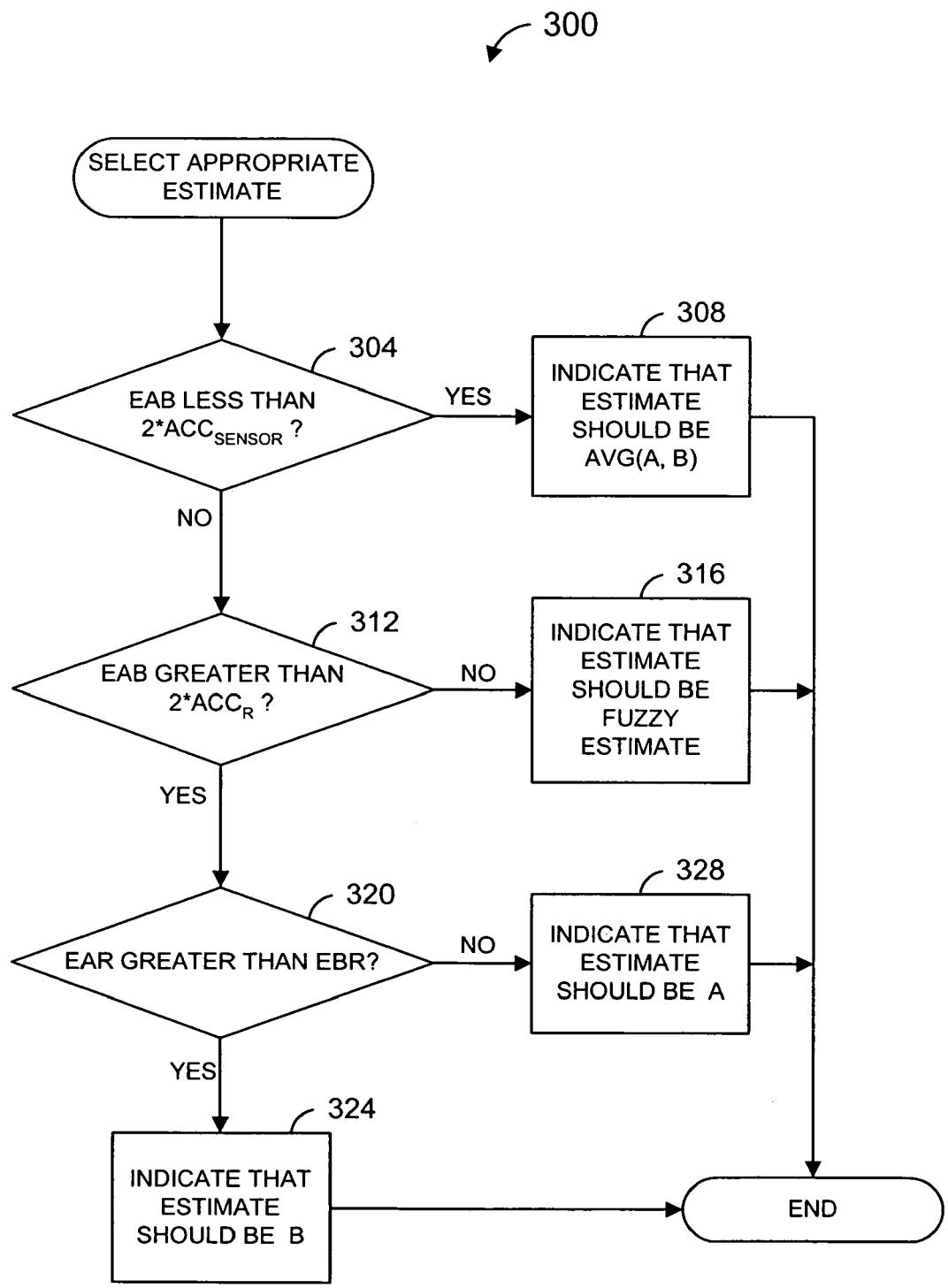
FIG. 7 is a flow diagram of an example method for selecting an appropriate technique for calculating an estimate of a parameter.

FIG. 7 is a flow diagram of an example method 300 for selecting an appropriate technique for calculating an estimate of the parameter. The method 300 may be implemented, for example, by the estimate selector 168 of FIG. 5.

At a block 304, it may be determined if EAB is less than twice $ACC_{SENSOR}$. If EAB is less than twice $ACC_{SENSOR}$, then the flow may proceed to a block 308. At the block 308, it may be indicated that the estimate of the parameter should be set to the average of A and B. If EAB is not less than twice $ACC_{SENSOR}$, then the flow may proceed to a block 312. In implementations in which the accuracies of the redundant sensors are not the same, it may be it may be determined at the block 304 if EAB is less than the sum of the sensor accuracies.

At the block 312, it may be determined if EAB is greater than twice $ACC_R$. If EAB is greater than twice $ACC_R$, then the flow may proceed to a block 316. At the block 316, it may be indicated that the estimate of the parameter should be set to the output of the fuzzy logic estimate calculator 180 (FIG. 5). If EAB is not greater than twice $ACC_R$, then the flow may proceed to a block 320.

At the block 320, it may be determined if EAR is greater than EBR. If EAR is greater than EBR, then the flow may proceed to a block 324. At the block 324, it may be indicated that the estimate of the parameter should be set to the B. If EAR is not greater than EBR, then the flow may proceed to a block 328, at which it may be indicated that the estimate of the parameter should be set to the A.

Fuzzy Logic Estimate Calculator

Figure 8:
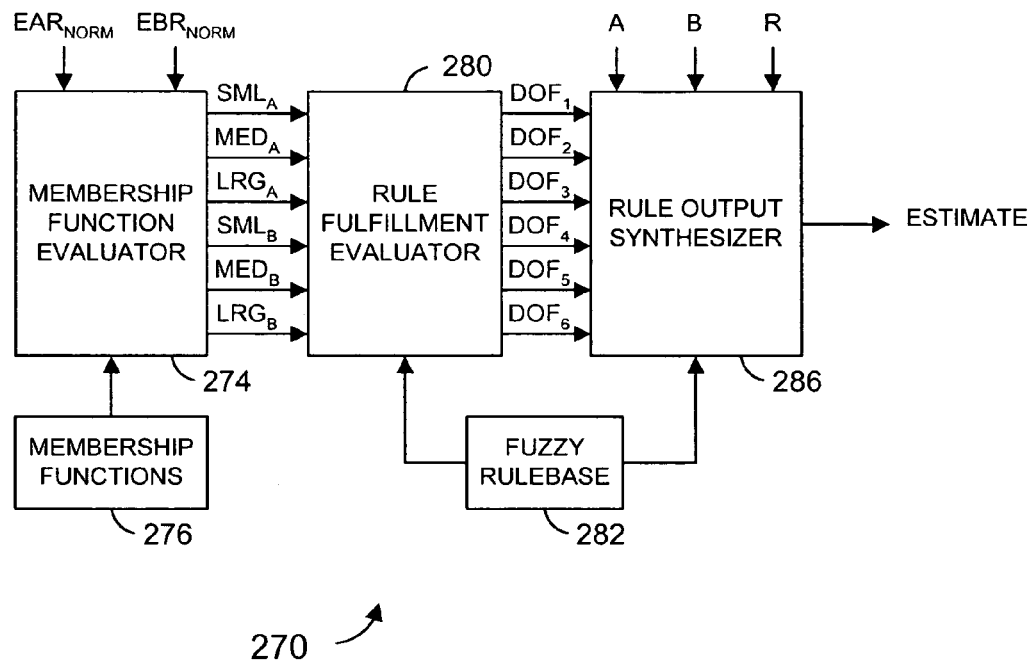
FIG. 8 is a block diagram of an example of the fuzzy logic estimate calculator of FIG. 5.

Referring again to FIG. 5, the estimate of the parameter may, in some cases, be generated by the fuzzy logic estimate calculator 180. FIG. 8 is a block diagram of an example fuzzy logic estimate calculator 270 that generates an estimate based on the signals $EAR_{NORM}$ and $EAR_{NORM}$. The fuzzy logic estimate calculator 270 may comprise a membership function evaluator 274 that evaluates the degree of membership of $EAR_{NORM}$ and $EAR_{NORM}$ in various fuzzy sets specified by a fuzzy rulebase 276, and generates outputs indicative of the degrees of membership. In this example, the fuzzy rulebase 276 may specify three different fuzzy sets: Small, Medium, and Large. Thus, the membership function evaluator 274 may generate three indications of degrees of membership ($SML_A$, $MED_A$, and $LRG_A$) for the signal $EAR_{NORM}$ corresponding to three fuzzy sets (Small, Medium, and Large). Similarly, three indications ($SML_B$, $MED_B$, and $LRG_B$) may be generated for the signal $EBR_{NORM}$ corresponding to the three fuzzy sets.

Figure 9:
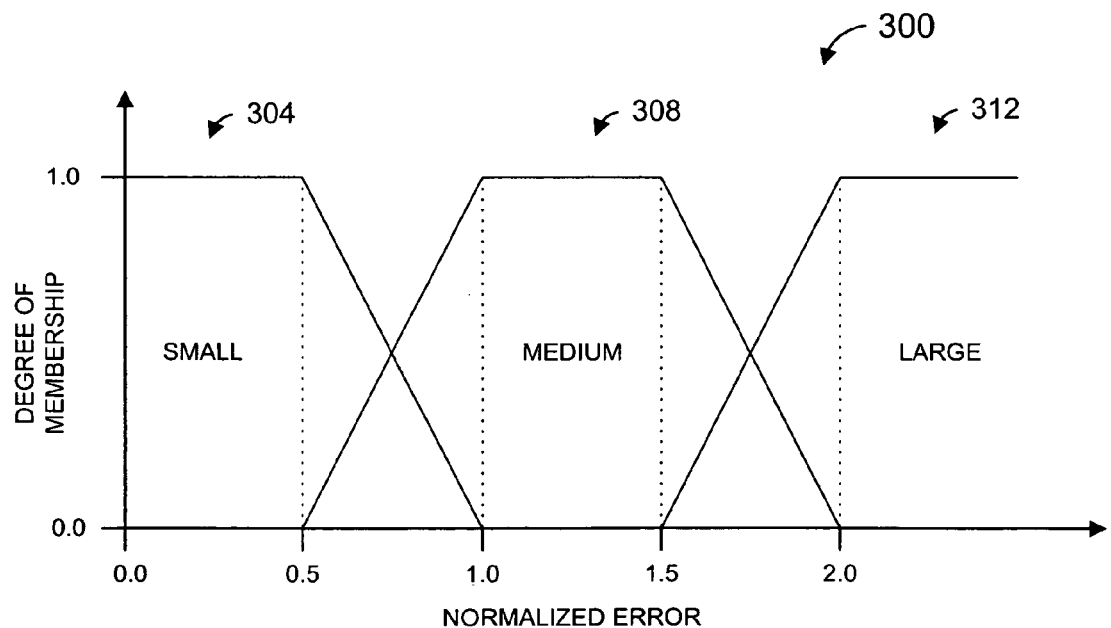
FIG. 9 is a graph of an example fuzzy rulebase.

FIG. 9 is a graph of an example fuzzy rulebase 300 for the three fuzzy sets Small 304, Medium 308, and Large 312. The same fuzzy rulebase 300 may be used for both $EAR_{NORM}$ and $EAR_{NORM}$. In other implementations, a different fuzzy rulebase may be used for $EAR_{NORM}$ and $EAR_{NORM}$, and different numbers of fuzzy sets may be used (i.e., more or less than three).

Figure 10:
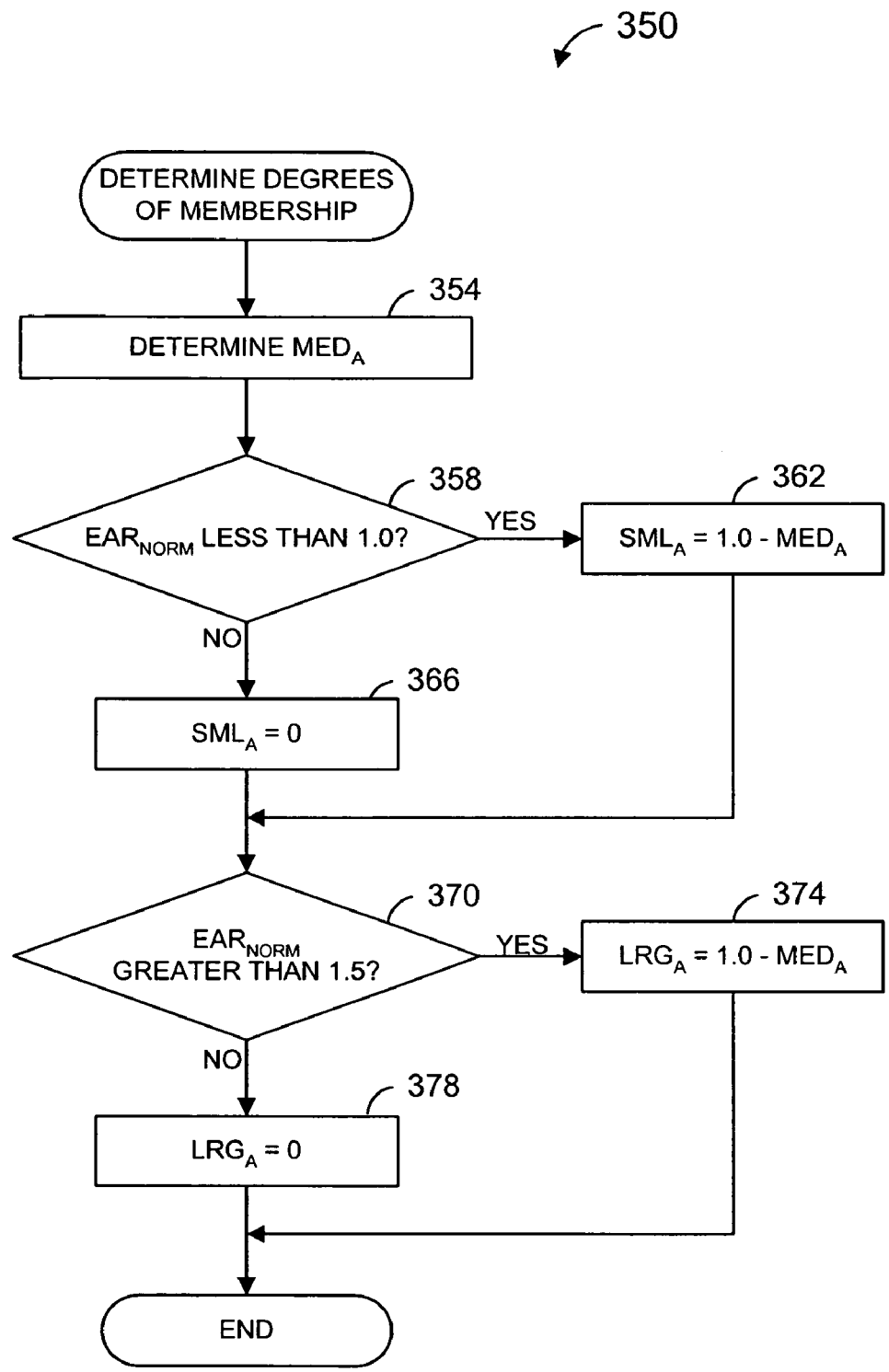
FIG. 10 is a flow diagram of an example method for determining degrees of membership in fuzzy sets.

With the fuzzy rulebase 300 of FIG. 9, a degree of membership in a set may be determined based on a degree of membership in another set. FIG. 10 is a flow diagram of an example method 350 for determining degrees of membership for the signal $EAR_{NORM}$ in the sets specified in FIG. 9. A similar method may be used to determine degrees of membership for the signal $EBR_{NORM}$.

At a block 354, a degree of membership in the Medium set may be determined for the signal $EAR_{NORM}$. The degree of membership in the Medium set may be determined using a variety of techniques, including known techniques. For example, the degree of membership in the Medium set may be calculated using one or more equations, determined via a look-up-table, and/or determined via interpolation.

At a block 358, it may be determined if $EAR_{NORM}$ is less than 1.0. If $EAR_{NORM}$ is less than 1.0, the degree of membership in the Small set may be determined as 1.0 minus the degree of membership in the Medium set (block 362). If $EAR_{NORM}$ is not less than 1.0, the degree of membership in the Small set may be determined as zero (block 366).

At a block 370, it may be determined if $EAR_{NORM}$ is greater than 1.5. If $EAR_{NORM}$ is greater than 1.5, the degree of membership in the Large set may be determined as 1.0 minus the degree of membership in the Medium set (block 374). If $EAR_{NORM}$ is not greater than 1.5, the degree of membership in the Large set may be determined as zero (block 378).

Referring again to FIG. 9, the membership functions of FIG. 9 are merely one example of a set of membership functions that may be used, and it is to be understood that different membership functions may be used as well. For example, one or more different thresholds may be used besides those illustrated in FIG. 9. Additionally, the degree of membership in a first set need not be a function of 1.0 minus the degree of membership in a second adjacent set. Further, the membership functions may specify more or less than three fuzzy sets. Still further, a value different than 1.0 may be used to indicate full membership in a set.

Referring again to FIG. 8, the fuzzy logic estimate calculator 270 may also comprise a rule fulfillment evaluator 280 that evaluates the degree of fulfillment (DOF) of each of a plurality of fuzzy logic rules 282 based on the degrees of membership signals generated by the membership function evaluator 274. In the example of FIG. 8, the rule fulfillment evaluator 280 generates six degrees of fulfillment ($DOF_1$, $DOF_2$, $DOF_3$, $DOF_4$, $DOF_5$, $DOF_6$) corresponding to six fuzzy logic rules 282. An example set of six fuzzy logic rules corresponding to $DOF_1$, $DOF_2$, $DOF_3$, $DOF_4$, $DOF_5$, and $DOF_6$ is provided below:

1) IF $EAR_{NORM}$ is Small AND $EBR_{NORM}$ is Small OR IF $EAR_{NORM}$ is Medium AND $EBR_{NORM}$ is Medium THEN Output is AVG(A, B, R);
2) IF $EAR_{NORM}$ is Small AND $EBR_{NORM}$ is Medium OR IF $EAR_{NORM}$ is Medium AND $EBR_{NORM}$ is Large THEN Output is AVG(A, R);
3) IF $EAR_{NORM}$ is Medium AND $EBR_{NORM}$ is Small OR IF $EAR_{NORM}$ is Large AND $EBR_{NORM}$ is Medium THEN Output is AVG(B, R);
4) IF $EAR_{NORM}$ is Small AND $EBR_{NORM}$ is Large THEN Output is A;
5) IF $EAR_{NORM}$ is Large AND $EBR_{NORM}$ is Small THEN Output is B;
6) IF $EAR_{NORM}$ is Large AND $EBR_{NORM}$ is Large THEN Output is R.

The above example set of rules are described in a tabular form in Table 1.

TABLE 1

| | | $EBR_{NORM}$ | | |
| --- | --- | --- | --- | --- |
| | | Small | Medium | Large |
| $EAR_{NORM}$ | Small | AVG(A, B, R) | AVG(A, R) | A |
| | Medium | AVG(B, R) | AVG(A, B, R) | AVG(A, R) |
| | Large | B | AVG(B, R) | R |

The DOF of a fuzzy logic rule may be determined using any number of techniques, including known techniques. For instance, if a rule specifies "X AND Y," the DOF may be the minimum of X and Y. Similarly, if a rule specifies "X OR Y," the DOF may be the maximum of X and Y. If a rule specifies "A AND B OR X AND Y" the DOF may be the max(min(A, B), min(X, Y)).

Figure 11:
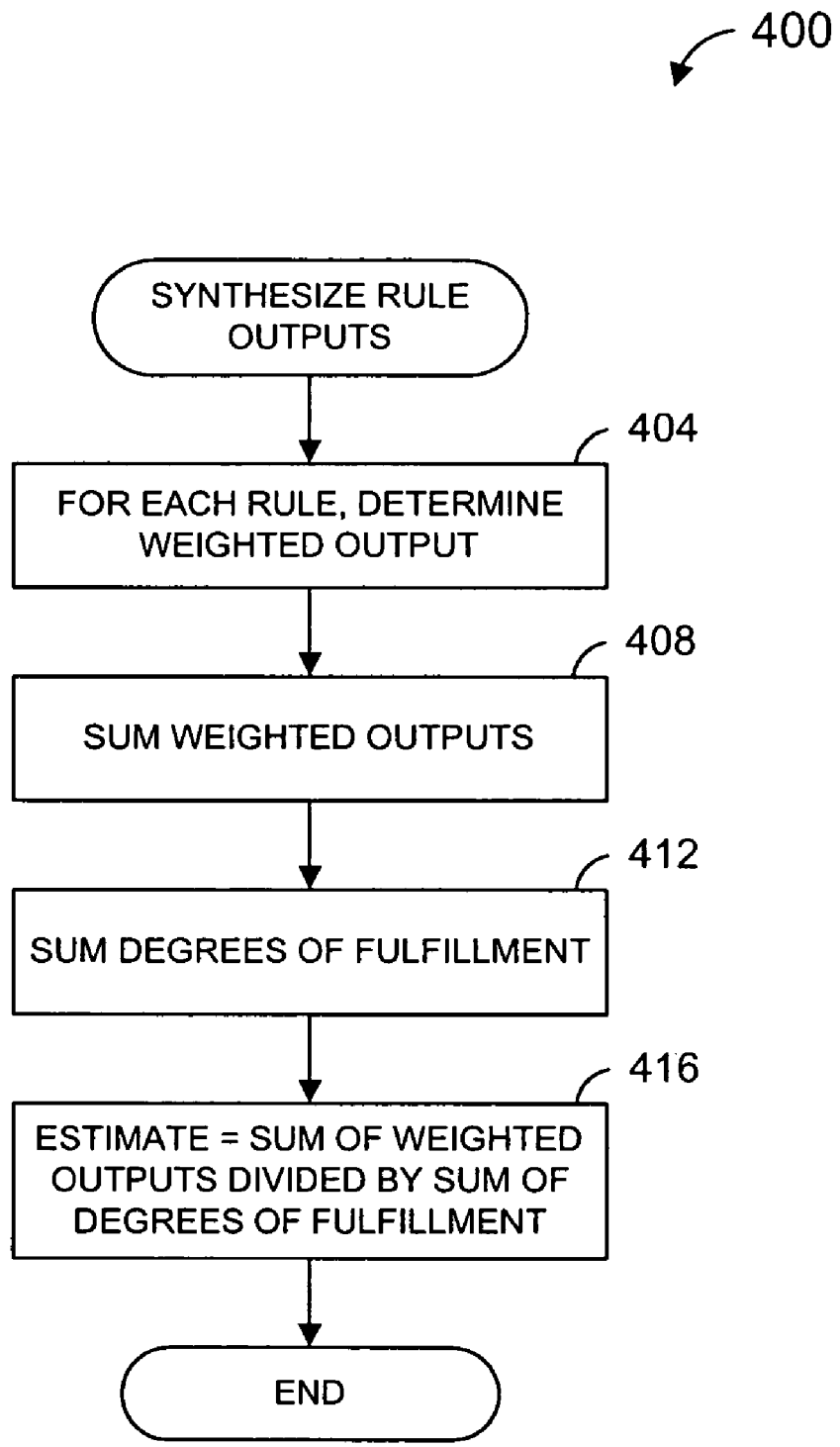
FIG. 11 is a flow diagram of an example method for evaluating fuzzy logic rules.

Referring again to FIG. 8, the fuzzy logic estimate calculator 270 may also comprise a rule output synthesizer 286 that evaluates the plurality of fuzzy logic rules 286 and the signals A, B, and R to generate the estimate of the parameter. In general, the rule output synthesizer 286 generates a weighted average of the signals A, B, and R based on weighting information, which may comprise, for example, $DOF_1$, $DOF_2$, $DOF_3$, $DOF_4$, $DOF_5$, and $DOF_6$. FIG. 11 is a flow diagram of an example method 400 for evaluating fuzzy logic rules to generate the estimate of the parameter.

At a block 404, a weighted output for each rule in the fuzzy rulebase is determined. An output of a rule may be specified by the text that proceeds a "THEN" in the rule. For instance, in the example fuzzy rulebase described above, the output of rule 1 is the average of A, B, and R. A weighted output of a rule may be determined by multiplying the output of the rule by its corresponding degree of fulfillment. Thus, in the example fuzzy rulebase described above, the weighted output of the rule 1 may be determined by calculating the average of A, B, and R, and then multiplying the average by $DOF_1$.

At a block 408, the weighted outputs calculated at the block 404 may be summed. At a block 412, the degrees of fulfillment associated with the fuzzy logic rules may be summed. For instance, referring to FIG. 8, the degrees of fulfillment $DOF_1$, $DOF_2$, $DOF_3$, $DOF_4$, $DOF_5$, and $DOF_6$ may be summed. Then, at block 416, the estimate of the parameter may be generated by dividing the sum of the weighted outputs by the sum of the degrees of fulfillment.

The rules 1 through 6 described above are merely one example of a fuzzy rulebase that may be used, and it is to be understood that different fuzzy rulebases may be used as well. For example, one or more of rules 1 through 6 may be modified or replaced with another rule. Also, more or less than six rules may be used.

Referring again to FIG. 8, the fuzzy logic estimate calculator 270 is merely one example of a fuzzy logic estimate calculator that may be used, and it is to be understood that other fuzzy logic estimate calculators may be used as well. For example, fuzzy inferencing may be performed using any of a variety of techniques, including known techniques. As another example, a fuzzy logic estimate calculator may employ output membership functions in generating the estimate of the parameter.

One or more of blocks illustrated in FIGS. 2–5 and 8, or portions of one or more blocks, may be implemented by software, hardware, and/or firmware, or some combination of software, hardware, and/or firmware. Similarly, the methods illustrated in FIGS. 6, 7, 10, and 11 may be implemented by software, hardware, and/or firmware, or some combination of software, hardware, and/or firmware. For any portions implemented by software, the software may be stored on a tangible medium such as CD-ROM, a floppy disk, a hard drive, a digital versatile disk (DVD), or a memory associated with a processor. Portions implemented by hardware may be implemented using, for example, any combination of one or more of analog circuits, digital circuits, integrated circuits, application specific integrated circuits, programmable logic arrays, programmable array logic, etc. Further, some of the blocks in FIGS. 2–8, 10, and 11 may be implemented, at least in part, using a neural network technique or apparatus. While the operation of some of the blocks illustrated in FIGS. 2–5 and 8 were described with reference to one or more of the flow diagram of FIGS. 6, 7, 10, and 11, it is to be understood that these blocks may operate according to different methods as well. For example, blocks of the methods of FIGS. 6, 7, 10, and 11 may be omitted and/or modified, new blocks may be added, and the order of blocks may be changed.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for estimating a parameter based on signals received from redundant sensors, the method comprising:
    receiving at least a first sensed signal and a second sensed signal from at least corresponding first and second redundant sensors, the first sensed signal and the second sensed signal indicative of the parameter, wherein the first sensed signal has associated therewith a first accuracy, wherein the second sensed signal has associated therewith a second accuracy;
    receiving at least a reference signal indicative of the parameter, wherein the reference signal has associated therewith a reference accuracy;
    determining a weighting based on at least the first sensed signal, the second sensed signal, and based on at least one of the first accuracy, the second accuracy, and the reference accuracy;
    generating an estimate of the parameter as a weighted average, according to the weighting, of at least a value of the first sensed signal, a value of the second sensed signal, and a value of the reference signal;
    generating a first error magnitude signal based on the first sensed signal and the second sensed signal;
    generating a second error magnitude signal based on the first sensed signal and the reference signal;
    generating a third error magnitude signal based on the second sensed signal and the reference signal;
    conveying the estimate of the parameter as a value of at least the first sensed signal or the second sensed signal, wherein determining the weighting and generating the estimate of the parameter comprises:
    determining the estimate of the parameter as a value of the first sensed signal if a value of the first error magnitude signal is greater than a threshold and if a value of the second error magnitude signal is less than a value of the third error magnitude signal, wherein the threshold is based on the reference accuracy; and
    determining the estimate of the parameter as a value of the second sensed signal if the value of the first error magnitude signal is greater than the threshold and if the value of the second error magnitude signal is more than the value of the third error magnitude signal.

2. A method as defined in claim 1, wherein determining the weighting and generating the estimate of the parameter comprises determining the estimate of the parameter as an average of a value of the first sensed signal and a value of the second sensed signal if a value of the first error magnitude signal is less than a threshold, the threshold based on the first accuracy and the second accuracy.

3. A method as defined in claim 2, wherein the threshold is based on the sum of the first accuracy and the second accuracy.

4. A method as defined in claim 3, wherein the threshold equals the sum of the first accuracy and the second accuracy.

5. A method as defined in claim 1, wherein the threshold equals twice the reference accuracy.

6. A method as defined in claim 1, wherein determining the weighting and generating the estimate of the parameter comprises determining the weighting and generating the estimate of the parameter according to a fuzzy rulebase if a value of the first error magnitude signal is greater than a first threshold and if the value of the first error magnitude signal is less than a second threshold, wherein the first threshold is based on the first accuracy and the second accuracy, and wherein the second threshold is based on the reference accuracy.

7. A method as defined in claim 6, further comprising:
    generating a second error magnitude signal based on the first sensed signal and the reference signal;
    generating a third error magnitude signal based on the second sensed signal and the reference signal;
    wherein determining the weighting and generating the estimate of the parameter according to the fuzzy rulebase comprises:
    determining degrees of membership of a value of the second error magnitude signal in a first plurality of fuzzy sets;
    determining degrees of membership of a value of the third error magnitude signal in a second plurality of fuzzy sets; and
    calculating the weighting based on the degrees of membership of the value of the second error magnitude signal and the degrees of membership of the value of the third error magnitude signal.

8. A method as defined in claim 7, further comprising:
    normalizing the second error magnitude signal, based on the first accuracy and the reference accuracy, prior to determining the degrees of membership of the value of the second error magnitude signal; and
    normalizing the third error magnitude signal, based on the second accuracy and the reference accuracy, prior to determining the degrees of membership of the value of the third error magnitude signal.

9. A method as defined in claim 8, wherein normalizing the second error magnitude signal comprises dividing the second error magnitude signal by the reference accuracy added with the first accuracy; and wherein normalizing the third error magnitude signal comprises dividing the third error magnitude signal by the reference accuracy added with the second accuracy.

10. A method as defined in claim 7, wherein determining the weighting and generating the estimate of the parameter further comprises determining a degree of fulfillment of each fuzzy logic rule in the fuzzy rulebase based on the degrees of membership of the value of the second error magnitude signal and the degrees of membership of the value of the third error magnitude signal.

11. A method as defined in claim 10, wherein generating the estimate of the parameter comprises:
determining weighted rule outputs by multiplying consequent portions of the fuzzy logic rules in the fuzzy rulebase by corresponding degrees of fulfillment of the fuzzy logic rules;
summing the weighted rule outputs;
summing the degrees of fulfillment of the fuzzy logic rules; and
dividing the summed weighted rule outputs by the summed degrees of fulfillment.

12. A method as defined in claim 1, wherein receiving the reference signal comprises receiving the reference signal from a model.

13. A method as defined in claim 1, wherein receiving the reference signal comprises receiving the reference signal from a third redundant sensor.

14. A method as defined in claim 1, wherein receiving the reference signal comprises receiving the reference signal from a processing device configured to generate the reference signal based on a signal, received from another sensor, indicative of a different parameter related to the parameter.

15. An apparatus for estimating a parameter based on signals received from redundant sensors, the apparatus comprising:
a weighting generator to generate weighting information in response to a first sensed signal, a second sensed signal, a reference signal, the weighting information based on a first accuracy associated with the first sensed signal, a second accuracy associated with the second sensed signal, and a reference signal accuracy associated with the reference signal;
wherein the weighting generator comprises an error magnitude calculator to calculate a first error magnitude signal based on the first sensed signal and the second sensed signal, a second error magnitude signal based on the first sensed signal and the reference signal, and a third error magnitude signal based on the first sensed signal, the second sensed signal, and the reference signal; and an estimate selector to generate an indication of one of a plurality of potential estimates of the parameter in response to the first error magnitude signal, the second error magnitude signal, and the third error magnitude signal, and based on the first accuracy, the second accuracy, and the reference signal accuracy;
wherein the first sensed signal is indicative of the parameter and corresponds to a first redundant sensor, wherein the second sensed signal is indicative of the parameter and corresponds to a second redundant sensor, and wherein the reference signal is indicative of the parameter; and
a weighted average calculator to generate an estimate of the parameter based on the first sensed signal, the second sensed signal, the reference signal, and the weighting information.

16. An apparatus according to claim 15, wherein the weighting calculator and the weighted average calculator comprise a fuzzy logic estimate calculator, wherein the plurality of potential estimates comprises the first sensed signal, the second sensed signal, and a fuzzy estimate generated by the fuzzy logic estimate calculator.

17. An apparatus according to claim 16, wherein the weighted average calculator further comprises an average calculator to calculate an average of the first sensed signal and the second sensed signal, wherein the plurality of potential estimates further comprises the average of the first sensed signal and the second sensed signal.

18. An apparatus according to claim 16, wherein the weighted average calculator further comprises a normalizer to generate a first normalized error magnitude signal in response to the second error magnitude signal, and a second normalized error magnitude signal in response to the third error magnitude signal; wherein the first normalized error magnitude signal is based on the first accuracy and the reference signal accuracy, and wherein the second normalized error magnitude signal is based on the second accuracy and the reference signal accuracy wherein the fuzzy logic estimate calculator generates the fuzzy estimate in response to the first normalized error magnitude signal and the second normalized error magnitude signal, and based on the first sensed signal, the second sensed signal, arid the reference signal.

19. An apparatus according to claim 15, further comprising a model configured to generate the reference signal.

20. An apparatus according to claim 15, comprising a processor operatively coupled to a memory, the first redundant sensor, and the second redundant sensor, the memory having stored thereon:
first code to implement the weighting generator; and
second code to implement the weighted average calculator.

21. A method for estimating a parameter based on signals received from redundant sensors, the method comprising:
receiving at least a first sensed signal and a second sensed signal from at least corresponding first and second redundant sensors, the first sensed signal and the second sensed signal indicative of the parameter, wherein the first sensed signal has associated therewith a first accuracy, wherein the second sensed signal has associated therewith a second accuracy;
receiving at least a reference signal indicative of the parameter, wherein the reference signal has associated therewith a reference accuracy;
generating a first error magnitude signal based on at least the first sensed signal and the reference signal;
generating a second error magnitude signal based on at least the second sensed signal an the reference signal;
normalizing the first error magnitude signal, based on at least the first accuracy, the second accuracy, and the reference accuracy, prior to determining the degrees of membership of the value of the second error magnitude signal;
normalizing the second error magnitude signal, based on at least the first accuracy, the second accuracy, and the reference accuracy, prior to determining the degrees of membership of the value of the third error magnitude signal;
evaluating a fuzzy rulebase based on at least the normalized first error magnitude signal and the normalized second error magnitude signal;
generating an estimate of the parameter based on at least the evaluated fuzzy rulebase; and conveying the estimate of the parameter as a value of at least the first sensed signal or the second sensed signal.

22. A method as defined in claim 21, wherein normalizing the first error magnitude signal comprises dividing the first error magnitude signal by the reference accuracy added with the first accuracy; and wherein normalizing the second error magnitude signal comprises dividing the second error magnitude signal by the reference accuracy added with the second accuracy.

23. A method as defined in claim 21, further comprising:

determining degrees of membership of a value of the normalized first error magnitude signal in a first plurality of fuzzy sets; and determining degrees of membership of a value of the normalized second error magnitude signal in a second plurality of fuzzy sets;

wherein evaluating the fuzzy rulebase comprises determining a degree of fulfillment of each fuzzy logic rule in the fuzzy rulebase based on the degrees of membership of the value of the normalized first error magnitude signal and the degrees of membership of the value of the normalized second error magnitude signal.

24. A method as defined in claim 23, wherein determining the degrees of membership of the value of the normalized first error magnitude signal comprises determining the degrees of membership of the value of the normalized first error magnitude signal according to a plurality of membership functions; and wherein determining the degrees of membership of the value of the normalized second error magnitude signal comprises determining the degrees of membership of the value of the normalized second error magnitude signal according to the plurality of membership functions.

25. A method as defined in claim 23, wherein determining degrees of membership of the value of the normalized first error magnitude signal in the first plurality of fuzzy sets comprises:

determining a degree of membership in a first fuzzy set based on the value of the normalized first error magnitude signal;

determining a degree of membership in a second fuzzy set based on the first degree of membership; and determining a degree of membership in a third fuzzy set based on the first degree of membership.

26. A method as defined in claim 25, wherein determining the degree of membership in the second fuzzy set comprises determining the degree of membership in the second fuzzy set as a value indicative of full membership minus the degree of membership in the first fuzzy set if the value of the normalized first error magnitude signal is less than a first threshold; and wherein determining the degree of membership in the third fuzzy set comprises determining the degree of membership in the third fuzzy set as the value indicative of full membership minus the degree of membership in the first fuzzy set if the value of the normalized first error magnitude signal is greater than a second threshold.

27. A method as defined in claim 26, wherein determining the degree of membership in the second fuzzy set comprises determining the degree of membership in the second fuzzy set as zero if the value of the normalized first error magnitude sign is greater than the first threshold.

28. A method as defined in claim 26, wherein determining the degree of membership in the third fuzzy set comprises determining the degree of membership in the third fuzzy set as zero if the value of the normalized first error magnitude signs is less than the second threshold.

29. A method as defined in claim 23, wherein determining degrees of membership of the value of the normalized first error magnitude signal in the first plurality of fuzzy sets comprises:

determining full membership in a first fuzzy set if the value of the normalized first error magnitude signal is less than a first threshold;

determining less than full membership in the first fuzzy set if the value of the normalized first error magnitude signal is greater than the first threshold;

determining full membership in a second fuzzy set if the value of the normalized first error magnitude signal is greater than a second threshold and less than a third threshold;

determining less than full membership in the second fuzzy set if the value of the normalized first error magnitude signal is less than the second threshold;

determining less than full membership in the second fuzzy set if the value of the normalized first error magnitude signal is greater than the third threshold;

determining full membership in a third fuzzy set if the value of the normalized first error magnitude signal is greater than a fourth threshold; and determining less than full membership in the third fuzzy set if the value of the normalized first error magnitude signal is less than the fourth threshold.

30. A method as defined in claim 29, wherein determining less than full membership in the first fuzzy set comprises determining no membership in the first fuzzy set if the value of the normalized first error magnitude signal is greater than the second threshold;

wherein determining less than full membership in the second fuzzy set if the value of the normalized first error magnitude signal is less than the second threshold comprises determining no membership in the second fuzzy set if the value of the normalized first error magnitude signal is less than the first threshold;

wherein determining less than full membership in the second fuzzy set if the value of the normalized first error magnitude signal is greater than the third threshold comprises determining no membership in the second fuzzy set if the value of the normalized first error magnitude signal is greater than the fourth threshold;

wherein determining less than full membership in the third fuzzy set comprises determining no membership in the third fuzzy set if the value of the normalized first error magnitude signal is less than the third threshold.

31. A method as defined in claim 30, wherein the first threshold is 0.5;

wherein the second threshold is 1.0;

wherein the third threshold is 1.5; and wherein the fourth threshold is 2.0.

32. A method as defined in claim 23, wherein generating the estimate of the parameter comprises:

determining weighted rule outputs by multiplying consequent portions of the fuzzy log rules in the fuzzy rulebase by corresponding degrees of fulfillment of the fuzzy log rules;

summing the weighted rule outputs;

summing the degrees of fulfillment of the fuzzy logic rules; and dividing the summed weighted rule outputs by the summed degrees of fulfillment.

33. A method as defined in claim 23, wherein the first plurality of fuzzy sets comprises a Small set, a Medium set, and a Large set, and wherein the second plurality of fuzzy sets comprises the Small set, the Medium set, and the Large set;

wherein A is a value of the first sensed signal corresponding to the value of the normalized first error magnitude signal, B is a value of the first sensed signal corresponding to the value of the normalized second error magnitude signal, and R is a value of the reference signal corresponding to the value of the normalized first error magnitude signal and corresponding to the value of the normalized second error magnitude signal;

wherein evaluating the fuzzy rulebase comprises evaluating at least some of the following fuzzy logic rules:

1) if $EAR_{NORM}$ is Small AND $EBR_{NORM}$ is Small OR if $EAR_{NORM}$ is Medium and $EBR_{NORM}$ is Medium THEN $X_A$ is the average of A, B, and R;
2) if $EAR_{NORM}$ is Small AND $EBR_{NORM}$ is Medium OR if $EAR_{NORM}$ is Medium and $EBR_{NORM}$ is Large THEN $X_B$ is the average of A and R;
3) if $EAR_{NORM}$ is Medium AND $EBR_{NORM}$ is Small OR if $EAR_{NORM}$ is Large and $EBR_{NORM}$ is Medium THEN X is the average of B and R;
4) if $EAR_{NORM}$ is Small AND $EBR_{NORM}$ is Large THEN $X_D$ is A;
5) if $EAR_{NORM}$ is Large AND $EBR_{NORM}$ is Small THEN $X_E$ is B;
6) if $EAR_{NORM}$ is Large AND $EBR_{NORM}$ is Large THEN $X_F$ is R;

wherein $EAR_{NORM}$ is the value of the normalized first error magnitude signal and $EBR_{NORM}$ is the value of the normalized second error magnitude signal, and wherein $X_A$, $X_B$, Xc, $X_D$, $X_E$, and $X_F$ are corresponding outputs of the fuzzy logic rules.

34. A method as defined in claim 33, wherein evaluating the fuzzy rulebase further comprises:

generating a weighted $X_A$ based on $X_A$ and a degree of fulfillment of the rule corresponding to $X_A$;
generating a weighted $X_B$ based on $X_B$ and a degree of fulfillment of the rule corresponding to $X_B$;
generating a weighted Xc based on Xc and a degree of fulfillment of the rule corresponding to Xc;
generating a weighted $X_D$ based on $X_D$ and a degree of fulfillment of the rule corresponding to $X_D$;
generating a weighted $X_E$ based on $X_E$ and a degree of fulfillment of the rule corresponding to $X_E$;
generating a weighted $X_F$ based on $X_F$ and a degree of fulfillment of the rule corresponding to $X_F$;
summing the weighted $X_A$, the weighted $X_B$, the weighted $X_C$ the weighted $X_D$, the weighted $X_E$, and the weighted $X_F$;
summing the degree of fulfillment of the rule corresponding to $X_A$, the degree of fulfillment of the rule corresponding to $X_B$, the degree of fulfillment of the rule corresponding to Xc, the degree of fulfillment of the rule corresponding to $X_D$, the degree of fulfillment of the rule corresponding to $X_E$, and the degree of fulfillment of the rule corresponding to $X_F$;
dividing the sum of the weighted $X_A$, the weighted $X_B$, the weighted Xc, the weighted $X_D$, the weighted $X_E$, and the weighted $X_F$ by the sum of the degree of fulfillment of the rule corresponding to $X_A$, the degree of fulfillment of the rule corresponding to $X_B$, the degree of fulfillment of the rule corresponding to Xc, the degree of fulfillment of the rule corresponding to $X_D$, the degree of fulfillment of the rule corresponding to $X_E$, and the degree of fulfillment of the rule corresponding to $X_F$.

35. A method as defined in claim 21, wherein the first accuracy equals the second accuracy.

36. A method as defined in claim 21, wherein the reference signal comprises a model output.

37. An apparatus for estimating a parameter based on signals received from redundant sensors, the apparatus comprising:

an error magnitude calculator to generate a first error magnitude signal and a second error magnitude signal in response to a first sensed signal received from a first redundant sensor, a second sensed signal received from a second redundant sensor, and a reference signal, the first sensed signal, the second sensed signal, and the reference signal indicative of the parameter;

a normalizer to generate a first normalized error magnitude signal and a second normalized error magnitude signal in response to the first error magnitude signal and the first error magnitude signal, and based on a first accuracy associated with the first sensed signal, a second accuracy associated with the second sensed signal, and a reference signal accuracy associated with the reference signal, wherein the normalizer generates the first normalized error magnitude signal as the first error magnitude signal divided by the reference signal accuracy added with the first accuracy, wherein the normalizer generates the second normalized error magnitude signal as the second error magnitude signal divided by the reference signal accuracy added with the second accuracy;

a fuzzy logic estimate calculator to generate an estimate of the parameter in response to the first normalized error magnitude signal and the second normalized error magnitude signal, and according to a fuzzy rulebase, wherein the fuzzy logic estimate calculator comprises a fuzzy membership evaluator to generate first degrees of membership n a first plurality of fuzzy sets for the first normalized error magnitude sign and to generate second degrees of membership in a second plurality of fuzzy sets for the second normalized error magnitude signal.

38. An apparatus according to claim 37, wherein the first plurality of fuzzy sets is the same as the second plurality of fuzzy sets.

39. An apparatus according to claim 37, wherein the fuzzy logic estimate calculator further comprises a rule fulfillment evaluator coupled to the fuzzy membership evaluator to generate degrees of fulfillment of a plurality of fuzzy rules based on the first degrees of membership and the second degrees of membership.

40. An apparatus according to claim 39, wherein the fuzzy logic estimate calculator further comprises a rule output synthesizer coupled to the rule fulfillment evaluator to generate the estimate of the parameter based on the degrees of fulfillment of the plurality of fuzzy rules.

41. An apparatus according to claim 37, wherein the first accuracy is the same as the second accuracy.

42. An apparatus according to claim 37, comprising a processor operatively coupled to a memory, the first redundant sensor, and the second redundant sensor, the memory having stored thereon:

first code to implement the error magnitude calculator;
second code to implement the normalizer; and
third code to implement the fuzzy logic estimate calculator.

43. An engine control system, comprising:
a first redundant sensor to generate a first sensed signal indicative of a parameter associated with an aircraft engine, the first sensed signal having a first accuracy associated therewith;
a second redundant sensor to generate a second sensed signal indicative of the parameter, the second sensed signal having a second accuracy associated therewith;
a reference signal generator to generate a reference signal indicative of the parameter, the reference signal having a reference signal accuracy associated therewith;
a weighting generator operatively coupled to the first redundant sensor, the second redundant sensor, and the reference signal generator to generate weighting information in response to the first sensed signal, the second sensed signal, and the redundant signal, the weighting information based on the first accuracy, the second accuracy and the reference signal accuracy;
a weighted average calculator to generate an estimate of the parameter in response to the first sensed signal, the second sensed signal, the redundant signal, and the weighting information,
wherein the weighting generator comprises an error magnitude calculator to calculate a first error magnitude signal based on the first sensed signal and the second sensed signal, a second error magnitude signal based on the first sensed signal and the reference signal, and a third error magnitude signal based on the first sensed signal, the second sensed signal, and the reference signal; and an estimate selector to generate an indication of one of a plurality of potential estimates of the parameter in response to the first error magnitude signal, the second error magnitude signal, and the third error magnitude signal, and based on the first accuracy, the second accuracy, and the reference signal accuracy.

44. An engine control system according to claim 43, wherein the engine control s comprises an aircraft engine control system.

45. An engine control system, comprising:
a first redundant sensor to generate a first sensed signal indicative of a parameter associated with an aircraft engine, the first sensed signal having a first accuracy associated therewith;
a second redundant sensor to generate a second sensed signal indicative of the parameter, the second sensed signal having a second accuracy associated therewith;
a reference signal generator to generate a reference signal indicative of the parameter, the reference signal having a reference signal accuracy associated therewith;
an error magnitude calculator operatively coupled to the first redundant sensor, the second redundant sensor, and the reference signal generator to generate a first error magnitude signal and a second error magnitude signal in response to the first sensed signal, the second sensed signal, and the reference signal;
a normalizer to generate a first normalized error magnitude signal and a second normalized error magnitude signal in response to the first error magnitude signal and the second error magnitude signal and based on the first accuracy, the second accuracy, and the reference signal accuracy,
wherein the normalizer generates the first normalized error magnitude signal as the first error magnitude signal divided by the reference signal accuracy added with the first accuracy,
wherein the normalizer generates the second normalized error magnitude signal as the second error magnitude signal divided by the reference signal accuracy added with the second accuracy;
a fuzzy logic estimate calculator to generate an estimate of the parameter in response to the first normalized error magnitude signal and the second normalized error magnitude signal, and according to a fuzzy rulebase,
wherein the fuzzy logic estimate calculator comprises a fuzzy membership evaluator to generate first degrees of membership n a first plurality of fuzzy sets for the first normalized error magnitude sign and to generate second degrees of membership in a second plurality of fuzzy sets for the second normalized error magnitude signal.

46. An engine control system according to claim 45, wherein the engine control system comprises an aircraft engine control system.

* * * * *

UNITED STATES PATENT AND TRADEMARK OFFICE
CERTIFICATE OF CORRECTION

PATENT NO. : 7,130,772 B2  Page 1 of 1
APPLICATION NO. : 10/819632
DATED : October 31, 2006
INVENTOR(S) : Cheri S. Burnet et al.

It is certified that error appears in the above-identified patent and that said Letters Patent is hereby corrected as shown below:

Column 16, claim 21, line 52, "an" should read --and--.

Column 19, claim 33, line 32, "Xc" should read --$X_C$--

Column 19, claim 34, line 40, "Xc" should read --$X_C$--

Column 19, claim 34, line 40, "Xc" should read --$X_C$--

Column 19, claim 34, line 41, "Xc" should read --$X_C$--

Column 19, claim 34, line 54, "Xc" should read --$X_C$--

Column 19, claim 34, line 59, "Xc" should read --$X_C$--

Column 19, claim 34, line 63, "Xc" should read --$X_C$--

Column 20, claim 37, line 38, "n" should read --in--
Column 21, claim 44, line 37, "s" should be deleted
Column 22, claim 45, line 34, "n" should read --in--

Signed and Sealed this

Fifteenth Day of May, 2007

JON W. DUDAS
*Director of the United States Patent and Trademark Office*